Oct. 23, 1945.  G. D. EDDINGTON  2,387,249
AUTOMATIC STABILIZING SYSTEM FOR VEHICLES
Filed April 19, 1943  2 Sheets-Sheet 1
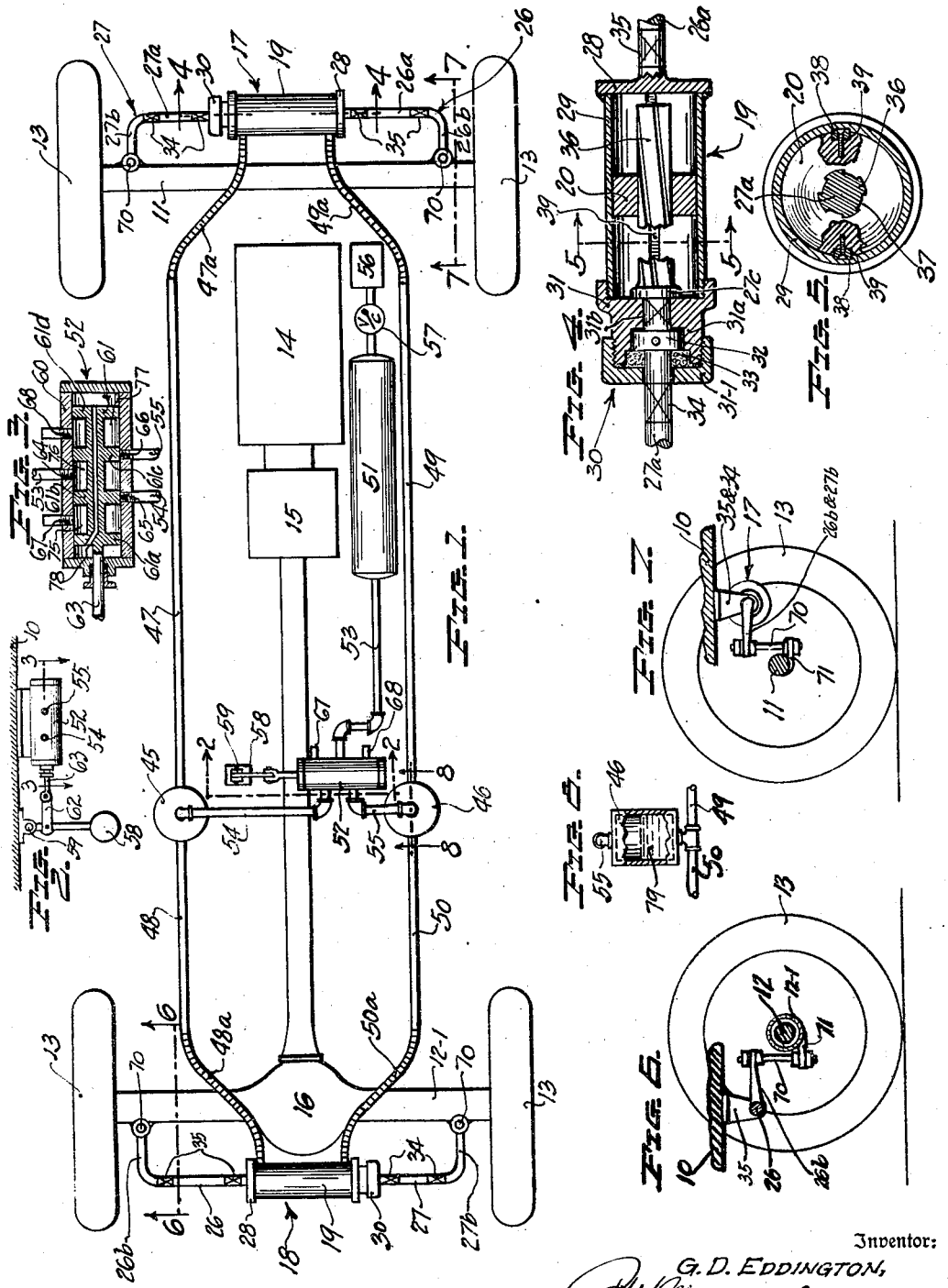
Inventor:
G. D. EDDINGTON,
By H. Mallinckrodt and
Philip A. Mallinckrodt.
Attorneys.

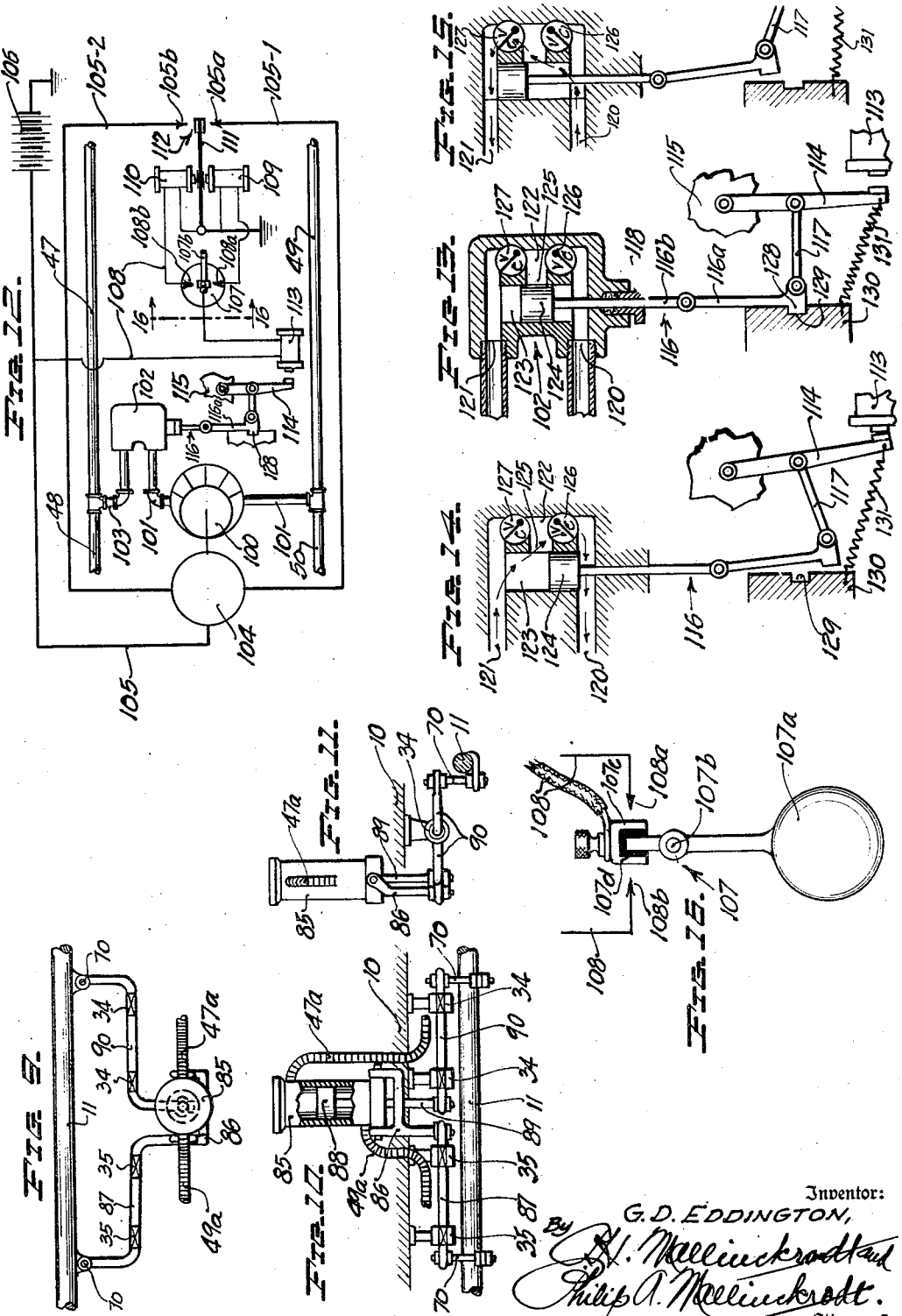

Patented Oct. 23, 1945

2,387,249

UNITED STATES PATENT OFFICE 2,387,249

AUTOMATIC STABILIZING SYSTEM FOR VEHICLES

George D. Eddington, Burbank, Calif.

Application April 19, 1943, Serial No. 483,599

9 Claims. (Cl. 280—124)

This invention relates to automatic stabilizing systems of a type which is particularly useful when applied to vehicles, such as automobiles, buses and trucks.

The riding or carrying compartments of motor-propelled vehicles for travel on land are ordinarily subject to considerable irregular displacement during travel. They sway or pitch uncomfortably when rounding curves, and react unpleasantly to uneven contour of roadways.

Among the principal objects of the invention therefore, are:

First, to automatically maintain the body of a vehicle at substantially even keel despite sidewise slopings, or irregularities, of the roadway upon which the vehicle is traveling.

Second, to automatically equate different portions of a vehicle horizontally during travel.

Third, to automatically bank the body of a vehicle as the vehicle rounds an unbanked turn in the road, thus counteracting centrifugal force and contributing to the riding comfort of the vehicle, as well as providing an effective safety factor.

Fourth, to accomplish the above with relatively simple equipment and at minimum expense.

Fifth, to provide an automatic stabilizing system of the type referred to, which will be positive and effective in action and rugged in construction.

In accomplishing the foregoing objects, and others hereinafter made apparent, means are provided for temporarily raising either one or the other side of the vehicle body, and for lowering, at the same time, the opposite side thereof relative to the running gear of the vehicle, in accordance with the deviation from normal of a level-sensitive control element, advantageously a pendulum. The raising and lowering means may be appropriately termed "stabilizing means," and such stabilizing means may include "levelers" which are directly effective upon the vehicle body.

The stabilizing means may be operated by hydraulic fluid, such as oil, motivated by a suitable pump. Preferably, however, the hydraulic fluid is motivated by compressed air released from a storage reservoir. But, regardless of how the stabilizing means is operated, the medium by which the operation is effected, is controlled, in its operating activity, by the pendulum control element.

In the accompanying drawings:

Fig. 1 is a diagrammatic view, in top plan, of a portion of the running gear of a vehicle equipped with a preferred embodiment of the invention designed to be operated through a hydraulic medium actuated by compressed air;

Fig. 2, a vertical section taken on the line 2—2, Fig. 1, showing the pendulum-operated control valve;

Fig. 3, a section taken on the line 3—3, Fig. 2, drawn to an enlarged scale, and illustrating the internal construction of the pendulum-operated control valve;

Fig. 4, a vertical section taken on the line 4—4, Fig. 1, drawn to an enlarged scale, and showing internal construction of one of the hydraulic stabilizing devices;

Fig. 5, a section taken on the line 5—5, Fig. 4;

Fig. 6, a vertical section taken on the line 6—6, Fig. 1;

Fig. 7, a vertical section taken on line 7—7, Fig. 1;

Fig. 8, a vertical section through one of the hydraulic reservoirs, taken on line 8—8, Fig. 1, the upper and lower portions being shown in elevation;

Fig. 9, a fragmentary top plan view of a somewhat different form of stabilizing device which can be used with the system of Fig. 1 in place of the stabilizing devices there shown;

Fig. 10, an elevation of the stabilizing device of Fig. 9, viewed from the front of a vehicle to which it may be attached, the cylinder being shown partly in section;

Fig. 11, a side elevation, looking from the right, of the stabilizing device of Figs. 9 and 10;

Fig. 12, a view corresponding to that of Fig. 1, but fragmentary in character and illustrating another embodiment of the invention, utilizing a hydraulic stabilizing fluid which is actuated by a pump, electrically controlled;

Fig. 13, a horizontal section taken through the electrically-controlled lock valve of Fig. 12, drawn to a considerably enlarged scale, the electrical control elements being shown in plan, and the valve being in closed or locked position;

Fig. 14, a view corresponding to Fig. 13, but showing the valve open for flow of fluid therethrough in one direction;

Fig. 15, a view corresponding to Figs. 13 and 14, but showing the valve open for flow of fluid therethrough in the opposite direction; and Fig. 16, a vertical section taken on the line 16—16, Fig. 12, and drawn to a considerably enlarged scale, showing the pendulum, and, diagrammatically, the pendulum-operated, electrical relay switch.

The inventive embodiment illustrated in Figs. 1 through 8, is shown as applied, for instance, to a conventional passenger automobile having a body 10, Figs. 2, 6 and 7, mounted upon a running gear which includes the front and rear axles 11 and 12, respectively, and the four wheels 13. The body 10 may be considered to include the customary chassis, or to be so constructed as to eliminate the need for same. The engine, transmission, and differential may be of conventional construction; and are illustrated diagrammatically at 14, 15 and 16, respectively, in Fig. 1. Other portions of the vehicle are not illustrated, but may be considered to be of conventional construction. Included in these portions are the springs which resiliently anchor the body to the running gear.

The body 10 is articulatively supported by the front axle 11 through the stabilizing device 17, and by the rear axle 12 through the similar stabilizing device 18.

It should be noted that, in this instance, but two stabilizing devices are employed. In instances where the vehicle concerned is a heavy truck or bus, it may be necessary to provide additional stabilizing devices intermediate the front and rear ends. This would involve, however, merely a duplication of parts, and is not here illustrated.

Each of the stabilizing devices 17 and 18 may comprise a cylinder 19 in which a piston head 20, Fig. 4, is adapted to be forced back or forth under the pressure of fluid admitted to the cylinder, at one or the other side of the piston head, from suitable fluid-storage means and under the control of a suitable control valve, both referred to in greater detail hereinafter.

The cylinder 19 of each of the stabilizing devices is secured to the body 10 of the vehicle by means of so-called levelers, which here take the form of bell cranks. In the case of the front stabilizing device 17, the cylinder 19 is preferably disposed in front of the front axle 11, and, in the case of the rear stabilizing device 18, is preferably disposed to the rear of the rear axle 12, thereby providing for the accommodation of the bell cranks between respective cylinders and opposite ends of the front and rear axles, as well as insuring advantageous application of the stabilizing forces.

Each of the cylinders 19 is articulatively connected to the particular axle with which it is associated by means of a pair of bell cranks—one, designated 26, being fixed to the cylinder housing, and the other, designated 27, passing through the cylinder housing into the interior thereof, thereby providing a shaft on which the piston 20 is mounted.

In the present instance, shaft portions 26a of the respective bell cranks 26 are secured to, and centrally of, the end caps 28 of the respective cylinder housings (see Fig. 4) it being understood that such end caps are fast on the respective cylindrical housing bodies 29. Shaft portions 27a of cranks 27 pass centrally through respective stuffing boxes 30, which serve as opposite end caps for the respective cylindrical housing bodies 29.

Each stuffing box 30 advantageously comprises a cap end piece 31, Fig. 4, which fits over and is fast on its particular end of the cylindrical housing body 29. This cap end piece has a hollow body portion 31a extending outwardly of the housing body. A bearing portion 31b serves to receive and journal the shaft portion 27a of the particular crank 27 concerned, while a collar 32, fixed rigidly on the shaft portion, provides a thrust bearing.

Packing material 33 is disposed within the hollow of body portion 31a, and hugs the shaft portion 27a. It is held in place by a cap 31—1, threaded over the open free end of the hollow body portion. The cap 31—1 is screwed into place sufficiently to compress the packing material in customary manner for preventing leakage of fluid supplied internally of the cylinder 19.

The shaft portions 27a of the respective bell cranks 27 are shouldered, as at 27c, to provide thrust bearings, which cooperate with the thrust bearings 32 to keep the bell cranks 27 in place. Externally of the cylinders 19, there are provided respective journal bearings 34, which serve to journal shaft portions 27a, the bearings being secured to the body or chassis 10. Similar journal bearings 35 are provided for the shaft portions 26a of bell cranks 26. The bell cranks 26 and 27 are thus secured to the body or chassis 10, but are free to rotate relative thereto.

These bell cranks 26 and 27 have crank portions 26b and 27b, respectively, which extend substantially at right angles to the shaft portions 26a and 27a. The crank portions have their outer extremities flexibly connected to the respective front and rear axles 11 and 12 of the running gear, so that they bear upon the axles, which serve as fulcrums at appropriate times, and yet are able to move relative thereto. The flexible connections each advantageously comprises a rod 70, see especially Figs. 6 and 7, secured at one of its ends to the extremity of a crank portion 26b or 27b, as the case may be, and, at its opposite end, to a bracket piece 71, which is firmly attached, as by welding, to the front axle 11 or to the housing 12—1 of the rear axle 12, as the case may be.

For the purpose of utilizing hydraulic pressure within the cylinder 19 for tilting the body 10 relative to the running gear, the terminal part of each shaft portion 27a is provided with spiral splines 36, which mesh with internally-formed splines 37, Fig. 5, of the particular piston head 20 concerned. The piston heads 20 are free to move backwardly and forwardly on their respectively associated spiral splines 36 under the influence of hydraulic pressure within the respective cylinders 19, but are provided with longitudinal grooves into which keys 38 are secured, as by means of small screws. The keys 38 are fitted into and slide within longitudinal grooves or keyways 39 formed in the walls of the respective cylindrical housing bodies 29, thus permitting longitudinal, back and forth movement of the piston heads 20, but preventing rotation thereof with respect to the cylindrical housing bodies 29.

It will be remembered that each cylindrical housing body 29 has an end cap 28 secured over one end thereof, and that the shaft portion 26a of a bell crank 26 is rigidly secured to the center of the end cap. Thus, considering the disposition of a bell crank 26 relative to the body 10 and to an axle, front 11 or rear 12, it can be seen that any strong rotative force applied to a piston head 20, will, if other factors hereinafter explained are right, tend to rotate its associated cylindrical housing body 29, and thereby, to actuate the associated bell crank 26. Depending upon which direction a piston head 20 and its associated cylindrical housing body 29 rotates, given a sufficient magnitude of rotative force applied thereto, the body 10 of the vehicle will be raised or lowered, relative to the running gear of the vehicle, at that side thereof at which the particular bell crank 26 under consideration is disposed. The axle serves as a fulcrum, the force being applied to the shaft portion 26a of the bell crank, and the work of either elevating or depressing the body 10 of the vehicle, being done at the journal bearings 35.

Since the piston heads 20, when reciprocated, also react against the spiral splines 36 of the shaft portions 27a, there is also a tendency to rotate such shaft portions 27a, and to actuate bell cranks 27. Since the bell cranks 26 and 27 are similarly mounted and disposed relative to the body 10 and running gear of the vehicle, rotation of each shaft portion 27a will either raise or lower (relative to the running gear, and depending upon the direction of rotation) that side of the body 10 at which the particular bell crank 27 is located.

It should be noted that the above-described arrangement is such that the shaft portions 26a and 27a of a set of connecting cranks will be rotated in mutually opposite directions on any given stroke of an associated respective piston head 20, thus raising one side of the body 10, relative to the running gear, while lowering the other side.

The relative extent of raising or lowering the two sides may differ considerably depending upon the respective resistances.

As illustrated in Fig. 4, movement of the piston head 20 to the right will rotate shaft portion 27a counterclockwise and shaft portion 26a clockwise, which means, considering the layout of Fig. 1, that that side of the body 10 which is illustrated in Fig. 6, will be raised, while that illustrated in Fig. 7 will be lowered.

It is necessary, of course, for producing the stabilizing effect contemplated by the invention, that all the stabilizing devices provided for a single vehicle act together at any given instant of time, to raise one given side and to lower the opposite side. The stabilizing device 17, in the illustrated embodiment, could not act on one side of the vehicle in one way while the stabilizing device 18 acted on the same side in an opposite way. Accordingly, care must be exercised in installing the system so the desired results will be achieved. In the illustrated embodiment, the stabilizing devices 17 and 18 are interchangeable, that is, the spiral splines 36 are of the same "hand," considered from the standpoint of screw-threading. This is possible because they are so arranged in the system that the respective piston heads 20 travel mutually oppositely, relative to their respectively associated bell cranks 26 and 27, at any given instant, that is, when the piston head 20 of stabilizing device 17 is traveling toward the crank portion 26b of its bell crank 26, the piston head 20 of stabilizing device 18 is traveling toward the crank portion 27b of its bell crank 27. Obviously, the spiral splines 36 can be made mutually opposite in "hand," in which case it is not necessary to reverse the position of one cylinder relative to the other.

The hydraulic system for supplying pressure to the cylinders 19 of the stabilizing devices 17 and 18 preferably comprises oil reservoirs 45 and 46. The reservoir 45 communicates with the left-hand ends of the front and rear cylinders 19 by means of piping 47 and 48, respectively, and the reservoir 46 communicates with the right-hand ends thereof by means of piping 49 and 50, respectively.

An air compressor 66, diagrammatically indicated in Fig. 1, is arranged to be driven by the motor 14 of the vehicle, through any conventional connecting means (not shown) and a check valve 57 guards against back-flow of air from the storage tank 51.

The control valve 52 is operated by a level-sensitive device, here shown as a pendulum 58, which responds to departures from the level, considered laterally, of the running gear of the vehicle. The pendulum 58, Figs. 1 and 2, is suspended from a pivot 59 secured to the body 10 at any convenient location. In Fig. 1, the pendulum device is located somewhat to the rear of the vehicle, but frequently it is preferred to locate it near the front of the vehicle so it will react with greater sensitivity when the vehicle rounds a curve.

The control valve 52 comprises a cylinder 60, Fig. 3, within which a multi-headed plunger 61 is adapted to slide in accordance with movement of the pendulum 58. A link 62, Fig. 2, articulatively connects the pendulum with the plunger rod 63.

The air-supply piping 53, see especially Figs. 1 and 3, leads from the air storage tank 51 to the intake port 64 of the control valve 52. The piping 54 leads from the outlet port 65 of the control valve to the left side of the vehicle, terminating in the hydraulic reservoir 45, and the piping 55 leads from the outlet port 66 of the control valve to the right side of the vehicle, terminating in the hydraulic reservoir 46. In addition, two exhaust ports 67 and 68, respectively, lead from the control valve to the atmosphere. It should be noted that the piping 47 and 48, which connect the hydraulic reservoir 45 with the front and rear stabilizer cylinders 19, respectively, comprise lengths 47a and 48a, respectively, of flexible tubing for accommodating the up and down movements of the stabilizing cylinders. Likewise, the piping 49 and 50, which connect the hydraulic reservoir 46 with the front and rear stabilizer cylinders 19, respectively, comprise lengths 49a and 50a, respectively, of flexible tubing.

The valve plunger 61 advantageously has four heads, 61a, 61b, 61c, and 61d, which define three air-flow channels 75, 76, and 77. A bleeder passage 78, extending longitudinally through the plunger 61, provides a by-pass for air from one closed end of the cylinder 60 to the other so as to prevent an air cushion from forming, which would restrict the action of the plunger.

In operation, the position of the pendulum 58 determines whether air from the storage tank 51 will flow through air-flow channel 76 of the control valve 52 into the hydraulic reservoir 45, causing the hydraulic medium, indicated 79, Fig. 8, to flow through the piping 47 and 48 into the left-hand portions of the stabilizing cylinders 19, to raise the left side and lower the right side of the vehicle body 10 in the manner heretofore explained, or whether air from the storage tank 51 will flow through the same air-flow channel 76 of the control valve, into the hydraulic reservoir 46, causing the hydraulic medium to flow through the piping 49 and 50, into the right-hand portions of the stabilizer cylinders 19, to raise the right side and lower the left side of the vehicle body 10, or whether any air at all will flow through the control valve. It should be noted that air from the hydraulic reservoirs 45 and 46 exhausts through the exhaust ports 67 and 68 respectively, of the control valve 52, passing back through air-flow channels 75 and 77, respectively, of the control valve.

The pendulum 58, because of gravity, tends to hang in a strictly vertical position, regardless of sidewise oscillation of the vehicle body 10, due to variations in sidewise slope of the road or terrain over which the vehicle is traveling, and thereby governs the action of control valve 52, which oscillates from side to side with the vehicle body. In rounding a turn, however, the centrifugal force acts on the pendulum as well as on the body, so that, in this instance, it is the resultant of the force of gravity and centrifugal force which determines the action of the pendulum on the control valve.

It should be noted that, when the body 10 of the vehicle slopes sidewise, its left side being lower than its right, the plunger 61 of the control valve moves toward the left from its neutral position of Fig. 3 and opens communication through air-flow channel 76, of air-supply piping 53 with the piping 54 which leads to hydraulic reservoir 45. At the same time, communication of the opposite piping 55, leading to hydraulic reservoir 46, is established with exhaust port 68, through air-flow channel 77 of the control valve. Thus, while the left side of the body 10 is being raised, the right side is being lowered, and the body assumes a laterally-level position relative to the roadway and to the running gear.

On the other hand, when the body 10 of the vehicle slopes sidewise so that its right side is lower than its left, the plunger 61 of the control valve moves toward the right from its neutral position of Fig. 3 and opens communication (through the same air-flow channel 76) of air-supply piping 53 with the piping 55, which leads to hydraulic reservoir 46. At the same time, communication of the opposite piping 54, leading to hydraulic reservoir 45, is established with exhaust port 67, through air-flow channel 75 of the control valve. Accordingly, the right side of the body 10 is raised, and the left side lowered, to place the body 10 in a laterally-level position relative to the roadway and to the running gear.

It should be noted that the plunger 61 of the control valve, when in its neutral position, positively closes piping 54 and 55 against return of air from either hydraulic reservoir 45 or hydraulic reservoir 46. Thus, return of the pendulum 58 to a right-angled or normal relationship with the body 10, and thereby, of plunger 61 to its neutral position, as occurs when the corrective, leveling factor is applied to the body through the stabilizing system of the invention, does not undo the work of the stabilizing system. It is only when the running gear of the vehicle again assumes a normal, laterally-level position, as occurs when the roadway is substantially level, sidewise, that the pendulum moves the plunger 63 in such a way as to cause the stabilizing system to return to its initial or inoperative condition.

In Figs. 9, 10 and 11 is illustrated another construction of the stabilizing mechanism. Like parts of this and the foregoing construction are designated by the same reference characters.

Here, the cylinder 85, corresponding to the front cylinder 19 is articulatively connected, as by means of a yoke 86, to a bell crank 87 (corresponding to a bell crank 26) for raising or lowering the left-hand side of the body 10. The bell crank 87 is journaled at 35, and is connected to the axle 11 by means of a flexible connection 70.

A piston 88, operable within the cylinder 85 and corresponding to the piston 20, is rigidly mounted on an end of connecting rod 89, which, in turn, has its opposite end connected to a bell crank 90. The bell crank 90 corresponds to a bell crank 27, and is effective, when actuated by movement of the piston 20, to raise or lower the right-hand side of the body 10. It is journaled at 34, and is connected to the axle 11 by means of a flexible connection 70.

Hydraulic medium is admitted to the cylinder 85, at one or the other side of piston 88, preferably by means of the same hydraulic and control system illustrated in the prior figures. Flexible piping 47a and 49a are shown in the present embodiment for the purpose of orientation with the prior figures.

It should be noted that in this embodiment, the piston and cylinder arrangement depends only on the mutually reciprocative relationship of piston and cylinder for the desired effect. There is no relative rotation between the two, as in the prior embodiment.

It should be understood that the particular structural relationship of cylinder and piston assembly, bell cranks, and connections may be considerably modified to suit various installation requirements. The question of available space in various models of vehicles will, to a large extent, determine the structural design of the stabilizing system, and the design may even vary considerably for the front and rear of the same vehicle.

The embodiment illustrated in Figs. 12 through 16 utilizes the leveling mechanism heretofore described. Accordingly, only the hydraulic control system is shown in these figures.

Here, the hydraulic fluid is stored in the piping of the system and is shifted from side to side by a pump, which is electrically controlled in accordance with the side-to-side swing of a pendulum control device.

For the purpose of correlating this hydraulic control system with the leveling mechanism of Fig. 1, the piping leading to the respective ends of the respective stabilizer cylinders 19 is designated in Fig. 12, as it is in Fig. 1, namely, 47, 48, 49 and 50.

A rotary pump 100 is interposed in piping 101, which leads to the right-hand piping 49 and 50 from an electrically controlled lock-valve 102. Piping 103 leads from the lock-valve 102 to the left-hand piping 47 and 48.

A reversible electric motor 104 is connected in a main electrical circuit 105, which has two branches 105—1 and 105—2, and which is advantageously powered by the usual battery 106 of the vehicle. The pendulum control device 107 is connected in an auxiliary electrical circuit 108, which is also powered by the battery 106.

The pendulum control device comprises a pendulum 107a, Fig. 16, adapted to oscillate about its mounting element 107b. A contact cap 107c, insulated from the pendulum proper by any suitable electrical insulation 107d, is mounted at the upper end of the pendulum for oscillation into contact with either the electrical contact 108a or 108b, depending upon the direction of swing of the pendulum, thus completing the auxiliary circuit 108 through either solenoid 109 or 110. These solenoids are arranged to act upon the contact arm 111 of a double keying relay 112, which serves to close the main electrical circuit 105 through either the branch 105—1 or 105—2, depending upon whether contact arm 111 moves into contact with the electrical contact 105a or the electrical contact 105b. As illustrated, solenoid 109 moves arm 111 so as to complete circuit 105 through the branch 105—1, while solenoid 110 moves arm 111 so as to complete circuit 105 through the branch 105—2. Completion of main circuit 105 through branch 105—1 will cause electric motor 104 to rotate, and thus to drive the pump 100, in one direction, while completion through branch 105—2 will cause rotation thereof in the opposite direction.

Accordingly, it can be seen that the oscillation of pendulum 107 controls the direction of operation of pump 100, which determines whether the hydraulic fluid in piping 49, 50 and the right-hand portion of 101 will be forced into the left-hand portion of piping 101, through lock-valve 102 into piping 103 and 47 and 48, or vice versa. Forcing of the hydraulic fluid from the piping at one side of the vehicle to the piping at the other side thereof, causes the hydraulic fluid which is already in that piping at the other side, to flow into the corresponding ends of the front and rear stabilizing cylinders 19, thereby leveling the vehicle in the manner heretofore explained.

The lock-valve 102 controls the flow of fluid from side to side of the vehicle. It is, itself, electrically controlled in accordance with oscillation of the pendulum control device 107.

A solenoid 113 is connected in the auxiliary electrical circuit 108 adjacent a lever arm 114 (see especially Fig. 13) which is arranged to be actuated by the solenoid. The lever arm 114 is pivoted at one end to a mounting 115 which is rigidly connected to a convenient portion of the running gear of the vehicle, and is linked, adjacent its middle, to the end section 116a of a piston rod 116 of the lock-valve 102, by a connecting link 117. The main section 116b of the piston rod 116 is arranged to slide back and forth through the housing of the lock-valve 102, a packing sleeve 118 being provided for the purpose.

The lock-valve 102 has a port 120 with which the left-hand portion of piping 101 communicates, and a port 121 with which piping 103 communicates. These ports are connected by a curved passage 122, which is conveniently U-shaped. A piston-slideway passage 123 connects two mutually spaced points of curved passage 122, and a piston head 124, mounted on the main section 116b of piston rod 116, is arranged to slide back and forth within this piston-slideway passage. A shunt passage 125, connects the piston-slideway passage, preferably centrally of its length, with the curved passage 122. The shunt passage intersects the curved passage between the two mutually spaced points thereof at which the piston-slideway passage intersects. A check valve 126 is placed in the curved passage 122 between the shunt passage and one of the two mutually spaced points, and an oppositely acting check valve 127 is placed therein between the shunt passage and the other of the two mutually spaced points.

The piston head 124 is normally locked in its intermediate position closing shunt passage 125. Because of the arrangement of check valves 126 and 127, this intermediate position of piston head 124 effectively cuts off all communication between ports 120 and 121, and prevents any flow of hydraulic fluid from one side of the vehicle to the other.

The locking of piston head 124 in its intermediate position is accomplished by the catching of a heel 128, which extends from the end section 116a of piston rod 116, within a notch 129, formed in an element 130. The element 130 is rigidly secured to the running gear of the vehicle (not shown) in any suitable manner.

Electrical energizing of the solenoid 113 pulls lever 114 in the manner illustrated in Fig. 14, thereby disengaging heel 128 from its locking notch 129. Then, depending upon the direction of rotation of motor 104 and pump 100, either hydraulic fluid from piping 103 is forced to push piston head 124, as in Fig. 14, and to flow through port 121, piston-slideway passage 123, shunt passage 125, curved passage 122, check valve 126, and, finally, out through port 120 into the left-hand portion of piping 101, or hydraulic fluid from piping 101 is forced to push piston head 124 as in Fig. 15, and to flow through port 120, piston-slideway passage 123, shunt passage 125, curved passage 122, check valve 127, and, finally, out through port 121 into piping 103.

Upon electrical de-energization of solenoid 113, spring 131 returns heel 128 to its locking notch 129, thereby returning piston head 124 to its normal intermediate position closing shunt passage 125, and locking it in this neutral closed position.

The hydraulic and control systems of Figs. 12 through 16 may be used with the type of stabilizing mechanism shown in Fig. 1, as well as with the type shown in Figs. 9, 10 and 11. Or, it may be used with other types of stabilizing mechanism which may be found suitable in particular instances.

With respect to the hydraulic and control systems of Fig. 1, it should be noted that the piping 47 and 48 and the piping 49 and 50, as well as the cylinders 19, on both sides of the piston heads 20, are advantageously filled with oil or other suitable non-compressible hydraulic medium at all times. Thus, since the hydraulic medium is non-compressible, there will be substantially instantaneous transmission to the piston heads 20 or to the pistons 88, Fig. 10, of the pressure exerted in the hydraulic reservoirs 45 and 46 by the compressed air admitted thereto.

This also holds true for the hydraulic and control systems of Fig. 12. Rotation of the pump 100 in either direction will transmit the pressure thereof substantially instantaneously to the piston heads 20, or to the pistons 88.

It can be easily seen that, with simple changes, the stabilizing system of the invention may be adapted to stabilize the body of a vehicle longitudinally, as well as transversely, if that is found to be desirable. Also, the invention may be adapted to stabilizing uses other than with vehicles, if the conditions are suitable.

Whereas this invention is here illustrated and described with respect to preferred specific embodiments thereof, it is to be understood that various changes may be made in these specific embodiments, and various other embodiments may be constructed, without departing from the spirit and generic purview of the invention as set forth herein and in the claims which here follow.

Having fully described my invention, what I claim is:

1. An automatic stabilizing system for vehicles having running gears and bodies, including in combination, stabilizing means operative between a running gear and a body for regulating the position of the body relative to the running gear from time to time during travel of a vehicle; means for operating said stabilizing means; means for controlling said operating means, said control means being responsive to the departure of said body from the horizontal; said operating means comprising a piston and cylinder arranged to react mutually oppositely on the stabilizing means, and to be actuated in common by a hydraulic medium, and means for supplying the hydraulic medium to the cylinders of said assemblies; and wherein the control means comprises a pump associated with the means for supplying the hydraulic medium and adapted to be driven in mutually opposite directions, a reversible electric motor adapted to drive said pump in either of said mutual opposite directions, a main electrical circuit in which said electric motor is connected, said circuit having two branches, keying means arranged to complete said circuit through either one or the other of said branches, completion through one branch causing said motor to rotate in one direction, and completion through the other branch causing said motor to rotate in the opposite direction, a pendulum disposed to oscillate in accordance with the off-horizontal positions of the vehicle body, means for actuating said keying means in accordance with the oscillations of said pendulum, a valve for controlling flow of the hydraulic medium, and means for actuating said valve in accordance with the oscillations of said pendulum.

2. An automatic stabilizing system for vehicles which have running gear and a body, including in combination, sets of levelers disposed at front and rear of the vehicle and extending laterally of the vehicle between the running gear and body, said sets of levelers being operative to regulate the position of the body relative to the running gear from time to time during travel of the vehicle; a closed cylinder and piston assembly interconnecting the levelers of each of said sets, and arranged to operate said levelers mutually oppositely when motivated; a piping system for supplying a hydraulic motivating medium to the cylinders of the cylinder and piston assemblies; means for imparting motion to said hydraulic motivating medium; means for regulating said motion-imparting means; and a device which is responsive to both gravity and centrifugal force arranged to control said regulating means according to sidewise deviations from the level of the body of said vehicle.

3. An automatic stabilizing system as recited in claim 2, wherein a set of levelers comprises bell cranks which are oppositely arranged.

4. An automatic stabilizing system as recited in claim 2, wherein a set of levelers comprise bell cranks oppositely arranged, each bell crank having a shaft portion and a crank at one end of the shaft portion; and wherein the cylinder of the associated cylinder and piston assembly is secured to the shaft portion of one bell crank; the shaft portion of the other bell crank of the said set is spirally splined and fitted through the free end of the cylinder so it can rotate relative thereto, the longitudinal axes of the said shaft portion and of the cylinder being in alignment; an internally splined piston head is threaded on the said spirally splined shaft portion for combined rotative and longitudinal movement therealong; means are provided keying said piston head to the cylinder, so the cylinder will rotate with said piston head without preventing longitudinal movement of said piston head along said spirally splined shaft portion; the shaft portions of the said bell cranks are journaled to the body of the vehicle; and the crank portion of both bell cranks are flexibly secured to the running gear of the vehicle.

5. An automatic stabilizing system as cited in claim 2, wherein a set of levelers comprise bell cranks oppositely arranged; each bell crank having a shaft portion and crank portions at opposite ends, respectively, of the shaft portion; and wherein the cylinder of the associated cylinder and piston assembly is linked to a crank portion of one of said bell cranks; the piston of the associated cylinder and piston assembly is adapted to slide back and forth within said cylinder, and is linked to a crank portion of the other of said bell cranks; the shaft portions of the said bell cranks are journaled to the body of the vehicle; and the other crank portions of the said bell cranks are flexibly secured to the running gear of the vehicle.

6. An automatic stabilizing system as recited in claim 2, wherein the hydraulic medium is stored in reservoir means; the means for imparting motion to the hydraulic motivating means comprises means for supplying compressed air to said reservoir means; and the regulating means comprises a valve for controlling the flow of the compressed air.

7. An automatic stabilizing system as recited in claim 2, wherein the hydraulic motivating medium is stored in the piping system; the motion-imparting means is a pump arranged to propel the hydraulic motivating medium through the piping system in one direction or in the reverse thereof; and the regulating means comprises means for driving the said pump either in the said one direction or in the reverse thereof.

8. An automatic stabilizing system as recited in claim 2, wherein the hydraulic motivating medium is stored in the piping system; the motion-imparting means is a pump arranged to propel the hydraulic motivating medium through the piping system in one direction or in the reverse thereof; the regulating means comprises a reversible electric motor for driving the said pump either in the said one direction or in the reverse thereof, a main electrical circuit in which said electric motor is connected, said circuit having two branches, and keying means arranged to complete said circuit through either one or the other of said branches, completion through one branch causing said motor to rotate in one direction and completion through the other branch causing said motor to rotate in the opposite direction; wherein the gravity and centrifugal force responsive device is arranged to control the said keying means; an electrically actuated lock-valve is interposed in the piping system for controlling flow of the hydraulic motivating medium, said lock-valve comprising a casing having an inlet port and an outlet port both connected to said piping system, a curved passage interconnecting said ports, a piston-slideway passage interconnecting two mutually spaced points of said curved passage, a shunt passage connecting an intermediate portion of said curved passage with an intermediate portion of said piston-slideway passage, a check valve disposed in said curved passage between said shunt passage and one of said two mutually spaced points, an oppositely acting check valve disposed in said curved passage between said shunt passage and the other of said two mutually spaced points, a piston disposed to slide within said piston-slideway passage across, and to one side or the other, of said shunt passage, thereby either stopping flow through the valve or allowing flow therethrough in one or the other direction, and means normally locking said piston in a position closing said shunt passage; wherein an auxiliary electrical circuit is provided; electrical means are connected in said auxiliary circuit for unlocking said piston-locking means, the gravity and centrifugal force responsive device being arranged to control the opening and closing of said auxiliary circuit; and means are provided for relocking said piston-locking means.

9. A vehicle stabilizer, including in combination, lever means disposed in proximity to the front of a vehicle body; a second lever means disposed in proximity to the rear of the vehicle body; each of the said lever means comprising two bell cranks having the shaft portions thereof rotatably mounted on the vehicle body and the crank portions thereof flexibly connected to the running gear of the vehicle; means operative to rotate the two shaft portions of each of the two said lever means in mutually opposed directions; level sensitive control means located between two ends of the vehicle body; connections extending from the said control means to the said shaft-rotating means whereby departure of the vehicle body from transverse levelness thereof causes the said shaft-rotating means to be actuated accordingly; the said shaft-rotating means comprising a closed cylinder; a piston movable longitudinally in the said cylinder but held against rotation relative to the cylinder, the said cylinder being secured to the shaft portion of one of the two bell cranks, and the piston engaging the shaft portion of the other of the two bell cranks through non-locking threading; a liquid medium occupying substantially the entire cylinder space on both sides of the piston; a source of compressed gas; and means whereby the said level sensitive-control means controls flow of compressed air into the said cylinder on either one side or the other, as the case may be, of the said piston.

GEORGE D. EDDINGTON.